Patented May 27, 1947

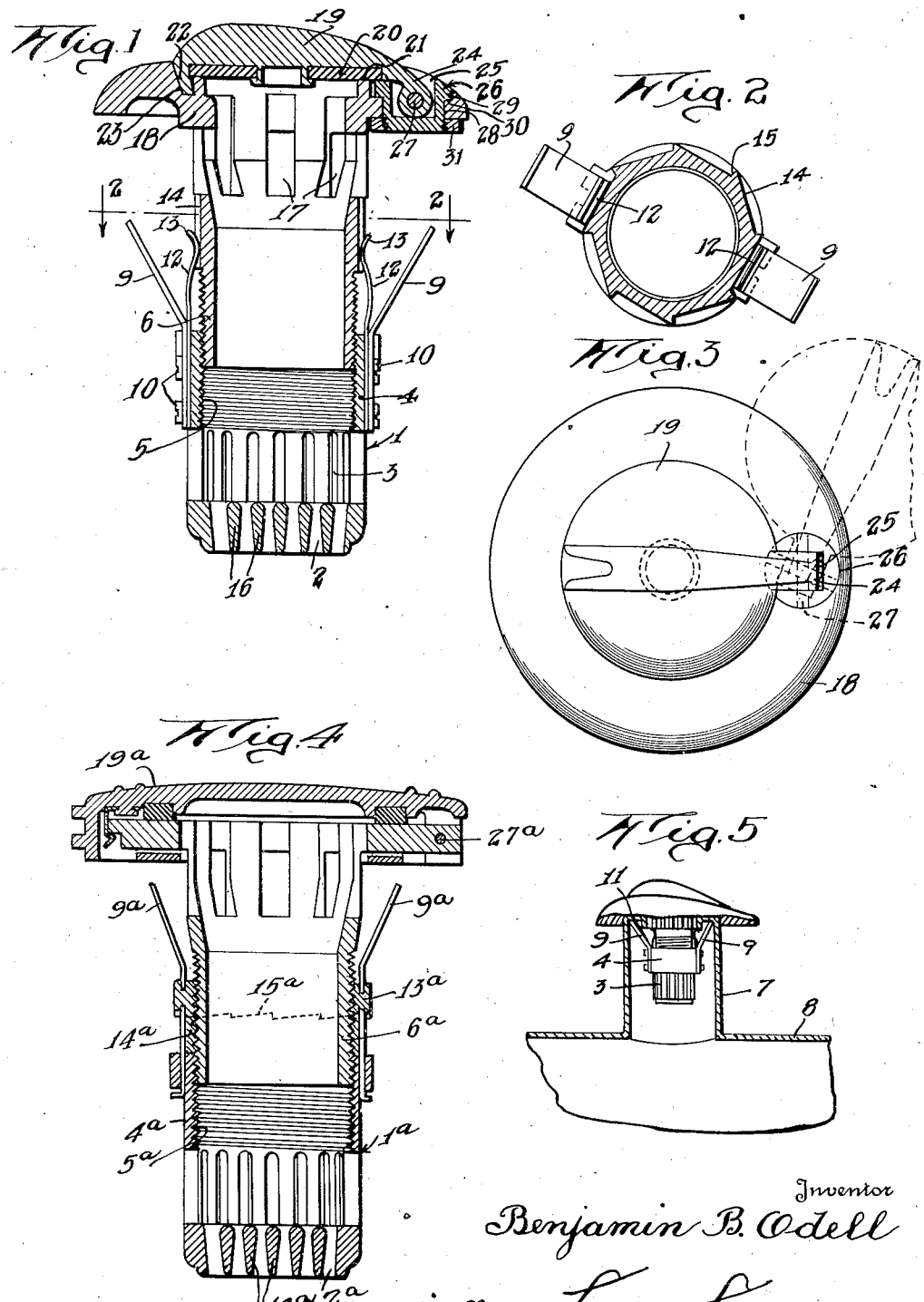

2,421,350

UNITED STATES PATENT OFFICE 2,421,350

TANK CAP

Benjamin B. Odell, Burbank, Calif.

Application May 21, 1946, Serial No. 671,307

7 Claims. (Cl. 220—86)

This invention relates to tank caps and more particularly to a cap for a tank which provides a closure therefor and which prevents withdrawal of liquid through the opening covered by the cap.

This invention is directed to an improvement in the tank closure disclosed in the Edward J. Sullivan Patent No. 2,284,107, granted May 26, 1942.

An object of this invention is to provide a tank closure which includes a means for preventing theft or removal of liquid from the tank and prevents the removal of the tank closure from the tank.

Another object of this invention is to provide a tank closure particularly applicable for adaptation to the intake conduit of a gasoline tank of a motor vehicle and which includes a grid element which extends transversely of the conduit and a means for supporting the grid within the conduit, including a screw means and ratchet operable to prevent reversal of the screw means whereby the closure and grid cannot be removed from the intake conduit.

Another object of this invention is to provide a tank closure element which provides an insert grid adapted to be mounted within the intake of a tank, relatively rotatable means for securing the tank closure element within the tank intake, and a pivotally mounted cap for closing the intake opening and which is rotatable to the required position to permit pivotal movement of the cap in opening, avoiding obstruction upon or adjacent the tank.

Other objects of my invention it is believed will be apparent from the hereinafter set forth description of the preferred embodiment of my invention illustrated in the accompanying drawings.

In the drawings:

Figure 1 is a sectional elevation of a tank closure embodying my invention.

Figure 2 is a sectional end elevation taken substantially on the line 2—2 of Figure 1.

Figure 3 is a top plan view thereof illustrating in dotted lines the pivotal and rotational operation of the tank closure cap.

Figure 4 is a sectional side elevation of a modified form of tank closure embodying my invention.

Figure 5 is a diagrammatic view of the tank closure of my invention illustrating the same in position with respect to an opening of a tank.

In the form of cap illustrated in Figures 1 to 3, there is shown a cylindrical grill element 1 having a transverse grill 2 at its bottom. Above the grill 2 is a screen formed by slotting the cylinder to provide a multiplicity of fluid passages 3 through the wall of the cylindrical grill.

The upper rim 4 of the grill 1 is internally threaded at 5. A sleeve 6 is threaded to the rim 4 at the threads 5 and provides the means for suspending the grill 1 within the inlet or inlet conduit 7 of a tank 8, whereby the grill 2 extends transversely of the inlet 7 preventing the insertion of a hose or suction conduit into the tank 8 for withdrawal of the liquid or gasoline therefrom.

Means are provided for preventing the withdrawal of the grill 2 from the tank inlet 7 and for preventing disconnection of the sleeve 6 from the grill element 1. As illustrated in Figures 1 and 2, this means includes one or more lock fingers 9 which are secured to the rim 4 by any suitable means, such as the screws 10. The lock fingers 9 are of spring steel permitting the same to flex inwardly when the grill element 1 is inserted in the tank inlet 7. Upon passing the inlet flange 11 the lock fingers extend outwardly so that they may engage the under surface of the flange 11, thus holding the grill element within the tank inlet conduit 7. The lock fingers exert a sufficient spring pressure against the inner surface to hold the grill element 1 from rotation during the screwing of the sleeve into the threads of the rim 4. This latter action results in forcing the upper ends of the lock fingers 9 against the under surface of the flange 11.

Unthreading of the sleeve 6 from the rim 4 is prevented by suitable means such as the ratchet formed by spring ratchet pawls 12 held upon the rim 4 by means of the screws 10. The pawl ends 13 of the ratchet pawls 12 engage ratchet surfaces 14 formed upon the sleeve 6. The ratchet surfaces 14 form an irreversible ratchet as they have stop shoulders 15 which engage the edges of the pawl ends 13.

The tank closure of my invention is so formed that gasoline will not overflow the inlet conduit 7 during filling of the tank with gasoline. To insure this result, the grill 2 is formed with a plurality of bars 16 which are spaced apart at the bottom of the grill element and are preferably of air foil cross section to reduce the resistance to flow. Air is thus free to flow from the tank when the tank is being filled through the inlet 7. The inflowing gasoline flows freely into the tank through the grill 2 and screen 3, while air is permitted to flow freely out of the inlet and out through the openings 17 formed through the sleeve 6.

The upper end of the sleeve 6 is provided with a circumferential flange 18, which may engage the upper surface of the tank 8 or the end of the inlet conduit 7 depending upon the length of the said inlet conduit 7.

A cap 19 is provided for closing the upper end of the sleeve 6. The cap 18 may be of any suitable form and has a sealing disc 20 mounted at its lower surface to engage the cylindrical seat 21 formed upon the flange 18. The cap 19 has a lock lip 22 which extends into the lock recess 23 to hold the cap in closed position. The cap 19 is formed with an integral hinge plate 24 which projects outwardly and downwardly into a hinge plate recess 25 formed in a rotator 26.

A hinge pin 27 is passed through the rotator 26 and hinge plate 24. The hinge pin extends parallel with the surface of the seat 21. The rotator is mounted in the flange 18 to rotate at right angles to the axis of the pin 27, thus providing for the vertical rotation of the cap 19 away from the inlet 7 as the cap is raised. This enables the cap 19 to be moved away from the inlet even in restricted places where it would otherwise be prevented from opening due to restricting surfaces, such as the bottom, fenders or other parts of an automobile upon which the tank 8 was mounted.

The rotator 26 is mounted to rotate in the flange bore 28. The rotator has a rim 29 engaging the stop surface 30 in the bore 28. The rotator may be held in position by any suitable means, as for example, the retaining ring 31 threaded to the lower end of the rotator 26 below the flange 18.

In the modified form of my invention illustrated in Figure 4, similar parts have been given the same numbers with the addition of exponents *a* thereto. This form of my invention differs primarily from that previously described in the form of irreversible ratchet provided for preventing unthreading of the sleeve 6a from the rim 4a of the grill element 1a. This ratchet includes a ratchet ring 13a which is slidably mounted upon the lock fingers 9a to slide therealong toward a complementary ratchet ring 14a carried by the rim 4a. The rings 13a and 14a have ratchet teeth 15a which prevent unthreading of the sleeve 6a from within the grill element threads 5a. As the ring 13a is free to move along the fingers 9a, the sleeve 6a may be threaded into the rim 4a. The teeth 15a are of the form of irreversible ratchet teeth and prevent unthreading as the ring 13a drops down on the fingers 9a.

While I have here illustrated two modifications of my invention, it is understood that my invention is subject to further and wider variation and change without departing from its definition as set forth in the accompanying claims.

I claim:

1. In a tank closure for a liquid tank, the combination of a grill element having a bottom grill, a sleeve threaded to the grill element, a spring lock finger secured to the grill element in position to engage an under surface of the liquid tank, and an irreversible ratchet means between the grill element and the sleeve to prevent unthreading of the sleeve from the grill element.

2. In a tank closure for a liquid tank, the combination of a grill element having a bottom grill and a side screen, a sleeve threaded to the bottom grill element, spring lock fingers secured to the grill element in position to engage the under surface of the liquid tank adjacent the liquid inlet opening thereto, and irreversible ratchet means between the grill element and the sleeve to prevent unthreading of the sleeve from the grill element.

3. In a tank closure for a liquid tank, the combination of a grill element having a bottom grill and a side screen, a sleeve threaded to the bottom grill element, spring lock fingers secured to the grill element in position to engage the under surface of the liquid tank adjacent the liquid inlet opening thereto, and irreversible ratchet means between the grill element and the sleeve to prevent unthreading of the sleeve from the grill element, the irreversible ratchet means comprising ratchet pawls secured to the grill element to engage corresponding ratchet surfaces formed on the sleeve.

4. In a tank closure for a liquid tank having a liquid inlet, the combination of a grill element having a bottom grill adapted to be inserted through the tank inlet, the grill element having spring urged lock fingers secured around its periphery in position to expand outwardly and engage the under surface of the liquid tank adjacent the liquid inlet, a sleeve threaded to the grill element to urge the lock fingers against the said tank surface upon relative rotation of the sleeve with reference to the grill element, and an irreversible ratchet means between the grill element and the sleeve holding the sleeve from rotation relative to the grill element to unthread the said sleeve from the grill element.

5. In a tank closure for a liquid tank, the combination of a grill element having a bottom grill, a sleeve threaded to the grill element, spring lock fingers, means for securing the spring lock fingers to the grill element, ratchet pawls secured to the grill element by the lock finger securing means, ratchet surfaces formed upon the sleeve engageable by the ratchet pawls to hold the sleeve from rotation in the direction to unthread the sleeve from the grill element.

6. In a tank closure for a liquid tank, the combination of a grill element having a bottom grill, a sleeve threaded to the bottom grill element, a spring lock finger secured to the grill element in position to engage an under surface of the liquid tank, an irreversible ratchet means between the grill element and the sleeve to prevent unthreading of the grill element from the sleeve, a cap pivotally secured to the sleeve exterior to the tank, and the pivot means between the cap and the sleeve including means permitting rotation of the cap in the plane of the cap pivot and around an axis perpendicular to the pivot.

7. In a tank closure for a liquid tank having a liquid inlet, the combination of a grill element having a bottom grill formed by a plurality of spaced bars having their upper surfaces formed to reduce turbulence of flow between said bars, a sleeve element threaded to the grill element, spring lock fingers secured to the grill element upon its exterior periphery and extending radially outward therefrom to engage an under surface of the liquid tank adjacent the liquid inlet, an irreversible ratchet means between the grill element and the sleeve permitting rotation of the sleeve relative to the grill element to engage the lock fingers with said under surface and acting to hold the sleeve from reverse rotation relative to the grill element.

BENJAMIN B. ODELL.